Jan. 6, 1931.   P. YUNGLING   1,787,713
SCREW GRAB
Original Filed May 29, 1929   2 Sheets-Sheet 1
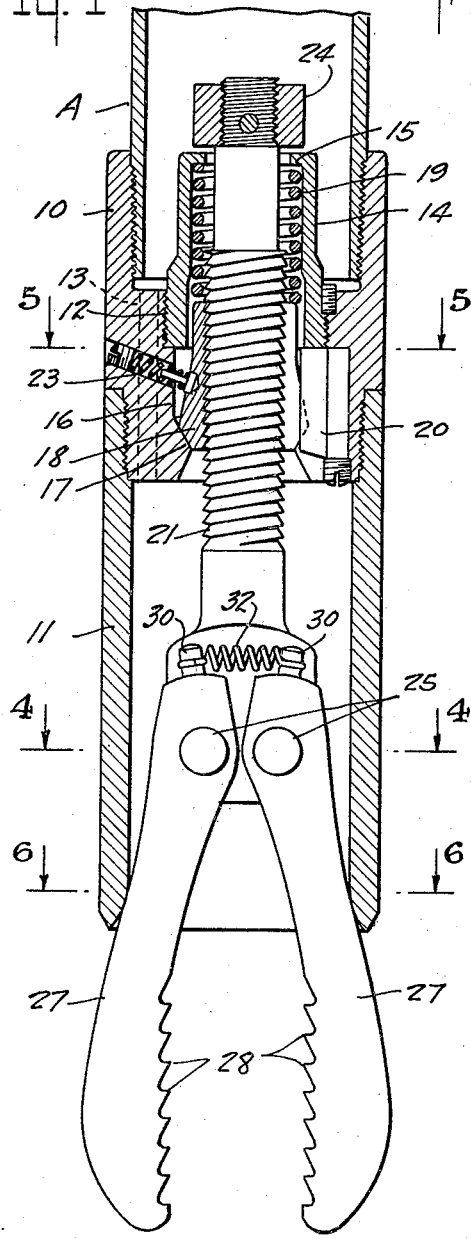
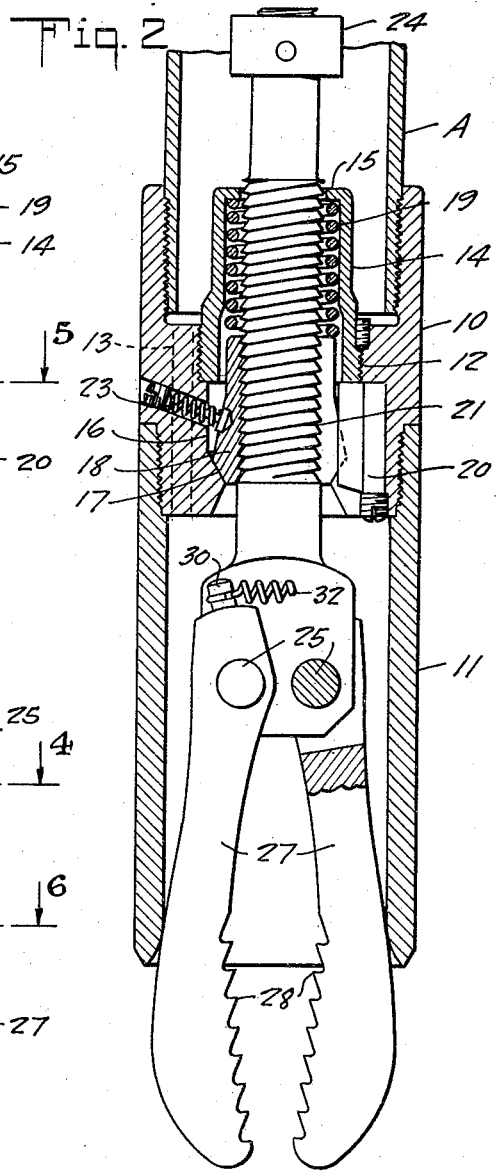
INVENTOR.
Paul Yungling
BY
Westall and Wallace
ATTORNEYS.

Jan. 6, 1931.  P. YUNGLING  1,787,713
SCREW GRAB
Original Filed May 29, 1929   2 Sheets-Sheet 2
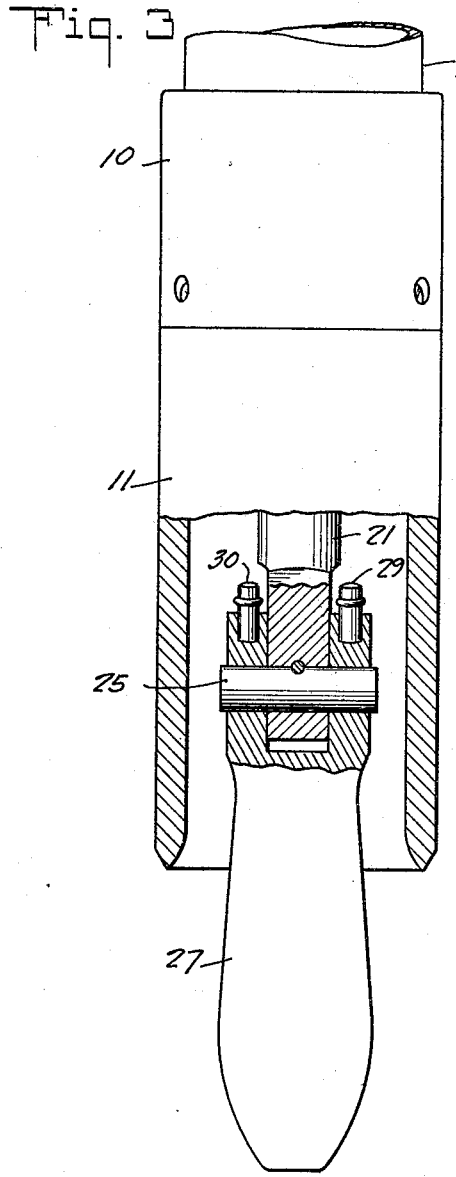
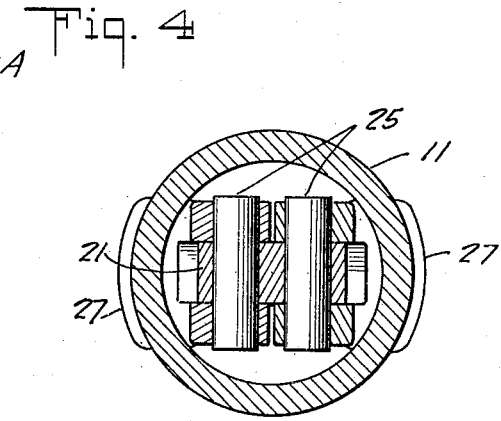
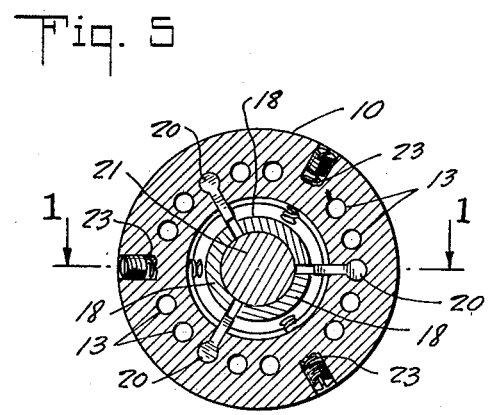
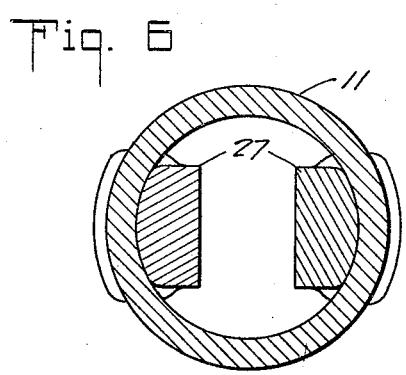
INVENTOR.
Paul Yungling
BY Westall and Wallace
ATTORNEYS.

Patented Jan. 6, 1931

1,787,713

UNITED STATES PATENT OFFICE

PAUL YUNGLING, OF LOS ANGELES, CALIFORNIA

SCREW GRAB

Application filed May 29, 1929, Serial No. 366,908. Renewed October 22, 1930.

This invention relates to fishing tools for use in well drilling and more particularly to the type known as "grabs". In the drilling of deep wells, it frequently happens that, due to mishaps with the drilling tools, or other causes, some object, frequently called a fish, is encountered on the bottom of the hole which renders further successful drilling of the hole impossible, or at the best difficult. A grab is one type of tool developed for removing such objects and is designed to be lowered into the well at the end of a string of tubing, termed the fishing string, and secure the fish and hold it while it is brought up to the surface of the ground.

The primary object of this invention is to provide an improved type of grab; other objects are, the provision of a grab in which it is possible, after getting the initial hold of the fish, to increase the tension of the grip by rotating the fishing string; and one which will not close or operate prematurely.

These objects together with other objects and corresponding accomplishments are secured by means of the embodiment of my invention illustrated in the accompanying drawings, in which:—

Fig. 1 is substantially an axial section through a grab, as seen on plane 1—1 of Fig. 5, showing the jaws in open position; Fig. 2 is a view similar to Fig. 1, showing the jaws closed; Fig. 3 is an elevation as seen looking from the right of Fig. 1, certain parts being broken away to show details of construction; Figs. 4, 5, and 6 are views as seen on the correspondingly numbered planes of Fig. 1;

Referring with more particularity to the drawings, 10 denotes the body of the grab, preferably cylindrical which is threaded at its upper end for attachment to the fishing string A and at its lower end for the attachment of a skirt 11. It has also an intermediate threaded portion 12 of reduced diameter, in which is secured a cage 14 terminating in a shoulder 15 at its upper end, and a bore 16 formed with a conical seat 17 at its lower end. Within this bore and on the seat are a number of slips 18 (preferably three) urged downwardly by spring 19 and inwardly by the slope of the seat, into contact with a circular stem 21, and normally supporting it. A number of passages 13 are formed in the body adjacent the bore to permit circulation to pass from the tubing A out through skirt 11 into the hole. Three keys 20 are provided to cause the shoes to rotate with body. This stem has an intermediate threaded portion, the threads being of a special form, as is plainly shown in Figs. 1 and 2. The upper surface of the thread makes an acute angle with the surface of the stem, while the lower surface makes nearly a right angle. The inner surface of shoes 18 is correspondingly threaded. Thus, when force is exerted tending to move the body downwardly with respect to the stem, the slips are forced upwardly from their seat against the spring 19 and outwardly by the upper surface of threads, permitting the body and attached parts to move down. As the points of the threads on stem pass those on the slips, the slips are forced back to their original position by spring 19, and if the force continues the action is repeated. When the force is reversed so that the body tends to move upwardly with respect to the stem, the nearly right angled faces of the threads engage and drag the slips down the conical seat, forcing the threads into engagement and preventing further movement. In other words, the threads form coacting teeth and a ratchet effect is obtained. A small compression spring 23 is mounted in the body in engagement with each slip to steady it and urge it against the stem. To the upper end of stem 21 is threadedly secured a large nut 24, which limits the downward movement of the stem by striking shoulder 15. The lower end of the stem is flattened, as best shown in Figs. 2 and 4, and has secured therein two large pins 25, upon which are pivotally mounted the jaw members 27, these being slotted to receive the flat portion of the stem. At the top of each jaw member is a pair of pins 29 and 30, which are connected by tension springs 32 urging the jaw members apart and into contact with skirt 11, the lower end of which is slightly belled.

By referring to Fig. 6, it will be seen that the backs of the jaws 27 fit the inside of the skirt 11. They are so curved in a vertical plane as to be forced together or closed as the skirt moves down and embraces them, (see Fig. 2). The inner surface of the jaws may be provided with teeth 28 to prevent the fish slipping from their grip. Jaws of modified form may be substituted, the details of design depending on the object it is desired to catch.

The grab is operated in the following manner. The jaws are opened to their fullest extent by screwing the stem as far out the body as possible, and the tool is attached to the end of a string of tubing. It is then lowered until bottom is touched. The string is then lowered a little more which forces the skirt down over the jaws, these resting on the bottom. This forces them together and any object between them will be gripped. If a turn or two is now made with the tubing, the skirt will be further forced over the jaws by the threads on the stem and the grip exerted by them will be greatly increased. The grab may now be brought back to the surface, the fish being tightly held between the jaws.

What I claim is:—

1. In a tool of the character described, a body with a bore extending therethrough and having a downwardly converging conical seat, a stem disposed within said bore, slips disposed on said seat within said bore and adapted to support said stem, jaw members pivotally attached to said stem, and a skirt depending from said body and embracing said jaw members.

2. In a tool of the character described, a body with a bore extending therethrough and having a downwardly converging conical seat therein, a stem disposed within said bore, a plurality of slips disposed within said bore and urged into contact with said stem by said seat, jaw members pivotally attached to said stem and a skirt formed on said body and adapted to close said jaws.

3. A tool of the character described, comrising a body with a bore extending therethrough, a threaded stem within said bore, correspondingly threaded slips between said bore and said stem, means to urge said slips into engagement with said stem, jaw members depending from said stem and means to close said jaw members upon movement of said stem relative to said body.

4. In a tool of the character described, a body with a bore extending therethrough and having a downwardly converging conical seat therein, a stem within said bore slips disposed within said bore and about said stem, resilient means urging said slips along said seat and into engagement with said stem there being coacting teeth on said slips and said stem whereby one way movement of said stem relative to said slips is permitted, jaws members pivotally attached to said stem resilient means urging said jaw members apart, and a skirt on said body adapted to force said jaw members apart.

5. A tool of the character described comprising a body with a bore extending therethrough, a downwardly converging conical seat in said bore, slips on said seat, means urging said slips downwardly along said seat, a stem within said bore normally in threaded engagement with said slips, jaw members depending from said stem and pivotally secured thereto, a skirt on said body and means urging said jaw members into contact with said skirt.

6. A tool of the character described comprising a body having a bore extending therethrough with a downwardly converging conical seat therein, a plurality of internally threaded slips on said seat and secured from rotation relative thereto, spring means urging said slips downwardly along said seat, a threaded stem disposed within said bore and normally in contact with said slips and supported thereby, jaw members pivotally secured to said stem, a skirt on said body adapted to close said jaw members, and spring means adapted to open said jaw members and maintain them in contact with said skirt.

7. A tool of the character described comprising a body having a bore extending therethrough, slips in said bore, a stem within said bore normally in threaded engagement with said slips and supported thereby, means to permit disengagement of said threads and upward movement of said stem relative to said slips, jaw members secured to said stem, and a skirt on said body adapted to close said jaw members upon upward movement of said stem relative to said body.

8. A tool of the character described comprising a body having a bore extending therethrough, a stem disposed within said bore and supported by slips therein, jaw members secured to said stem and adapted to be closed by a skirt on said body upon an upward movement of said stem relative to said body, means to permit an initial upward movement of said stem without rotation of said body relative to said stem, and means to cause a further upward movement of said stem relative to said body, upon rotation of the latter relative to said stem.

9. In a tool of the character described, a body with a bore extending therethrough and having a downwardly converging conical seat therein, a stem disposed within said bore, slips yieldably disposed on said seat and constituting a split nut for engaging said stem, jaw members pivotally secured to said stem, and a skirt depending from said stem and embracing said jaw members.

10. In a tool of the character described, a body with a bore extending therethrough and having a downwardly converging conical seat therein, a stem within said bore, slips disposed within said bore and about said stem, said slips constituting a split nut for engaging said stem, resilient means urging said slips along said seat, and into engagement with said stem, there being coacting teeth on said slips and said stem whereby one way movement of said stem relative to said slips is permitted, jaw members pivotally attached to said stem, resilient means urging said jaw members apart, and a skirt on said body adapted to force said jaw members together.

In witness that I claim the foregoing I have hereunto subscribed my name this 10th day of May, 1929.

PAUL YUNGLING.